(12) United States Patent
Navon et al.

(10) Patent No.: US 10,891,052 B2
(45) Date of Patent: Jan. 12, 2021

(54) ADAPTIVE SYSTEM FOR OPTIMIZATION OF NON-VOLATILE STORAGE OPERATIONAL PARAMETERS

(71) Applicant: Western Digital Technologies, Inc., Irvine, CA (US)

(72) Inventors: Ariel Navon, Revava (IL); Alex Bazarsky, Holon (IL); Judah Gamliel Hahn, Ofra (IL); Eran Sharon, Rishon Lezion (IL)

(73) Assignee: Western Digital Technologies, Inc., San Jose, CA (US)

( * ) Notice: Subject to any disclaimer, the term of this patent is extended or adjusted under 35 U.S.C. 154(b) by 263 days.

(21) Appl. No.: 15/633,307

(22) Filed: Jun. 26, 2017

(65) Prior Publication Data

US 2018/0373437 A1 Dec. 27, 2018

(51) Int. Cl.
*G06F 3/06* (2006.01)
*G06F 13/38* (2006.01)
*G06F 16/335* (2019.01)
*G06F 16/2457* (2019.01)
*G06F 12/00* (2006.01)

(52) U.S. Cl.
CPC ............ *G06F 3/0607* (2013.01); *G06F 3/061* (2013.01); *G06F 3/0605* (2013.01); *G06F 3/067* (2013.01); *G06F 3/0632* (2013.01); *G06F 3/0634* (2013.01); *G06F 3/0653* (2013.01); *G06F 3/0679* (2013.01); *G06F 3/0688* (2013.01); *G06F 12/00* (2013.01); *G06F 13/385* (2013.01); *G06F 16/2457* (2019.01); *G06F 16/335* (2019.01)

(58) Field of Classification Search
CPC .............................. G06F 3/0607; G06F 12/00
See application file for complete search history.

(56) References Cited

U.S. PATENT DOCUMENTS

| 6,515,909 B1 * | 2/2003 | Wooldridge | ........... G11C 16/16 365/185.19 |
| 8,982,617 B1 * | 3/2015 | Mekhanik | .......... G11C 16/3418 365/185.02 |

(Continued)

*Primary Examiner* — Charles Rones
*Assistant Examiner* — Tian-Pong Chang
(74) *Attorney, Agent, or Firm* — Morgan, Lewis & Bockius LLP

(57) ABSTRACT

A system and method for optimization of non-volatile storage operational parameters is provided. The method may utilize a crowdsourcing server to gather performance data for multiple storage devices connected to respective remotely located host systems. The performance data may be transmitted at regular intervals or at predefined events and the crowdsourcing server may aggregate and determine improved operating parameters for each different type of storage device based on the data gathered for multiple instances of that type of storage device. The optimized operating parameters may be selected from pre-stored and pre-qualified operating parameter sets on the respective storage devices that the crowdsourcing server is aware of. The system includes a non-volatile memory and a controller that is configured to log performance data and transmit at least a portion of that logged data to the crowdsourcing server. The controller may retrieve pre-stored operating parameters based on a crowdsourcing server recalibration command.

21 Claims, 9 Drawing Sheets

(56) References Cited

U.S. PATENT DOCUMENTS

| | | |
|---|---|---|
| 9,189,163 B2 | 11/2015 | Bhuiyan |
| 9,413,779 B2 | 8/2016 | Vasseur et al. |
| 9,569,120 B2 | 2/2017 | Ryan et al. |
| 2007/0150881 A1* | 6/2007 | Khawand ............ G06F 11/3409 717/162 |
| 2010/0333081 A1 | 12/2010 | Etchegoyen |
| 2012/0239991 A1* | 9/2012 | Melik-Martirosian ...................... G06F 11/3034 714/708 |
| 2013/0074092 A1* | 3/2013 | Gounares ............ G06F 9/44557 718/104 |
| 2013/0119130 A1* | 5/2013 | Braams ................ G06K 7/042 235/382 |
| 2014/0122776 A1* | 5/2014 | El Maghraoui ..... G06F 12/0246 711/103 |
| 2014/0136135 A1 | 5/2014 | Drukier et al. |
| 2016/0141042 A1 | 5/2016 | Peterson et al. |
| 2016/0282129 A1* | 9/2016 | Wang ...................... H04W 4/02 |
| 2017/0102895 A1* | 4/2017 | Kim ...................... G06F 3/0604 |
| 2017/0334450 A1* | 11/2017 | Shiraishi .................. H04W 4/80 |
| 2017/0358369 A1* | 12/2017 | Chinnakkonda Vidyapoornachary ...................... G11C 29/50004 |
| 2018/0357002 A1* | 12/2018 | Prakash ................ G06F 3/0611 |

* cited by examiner

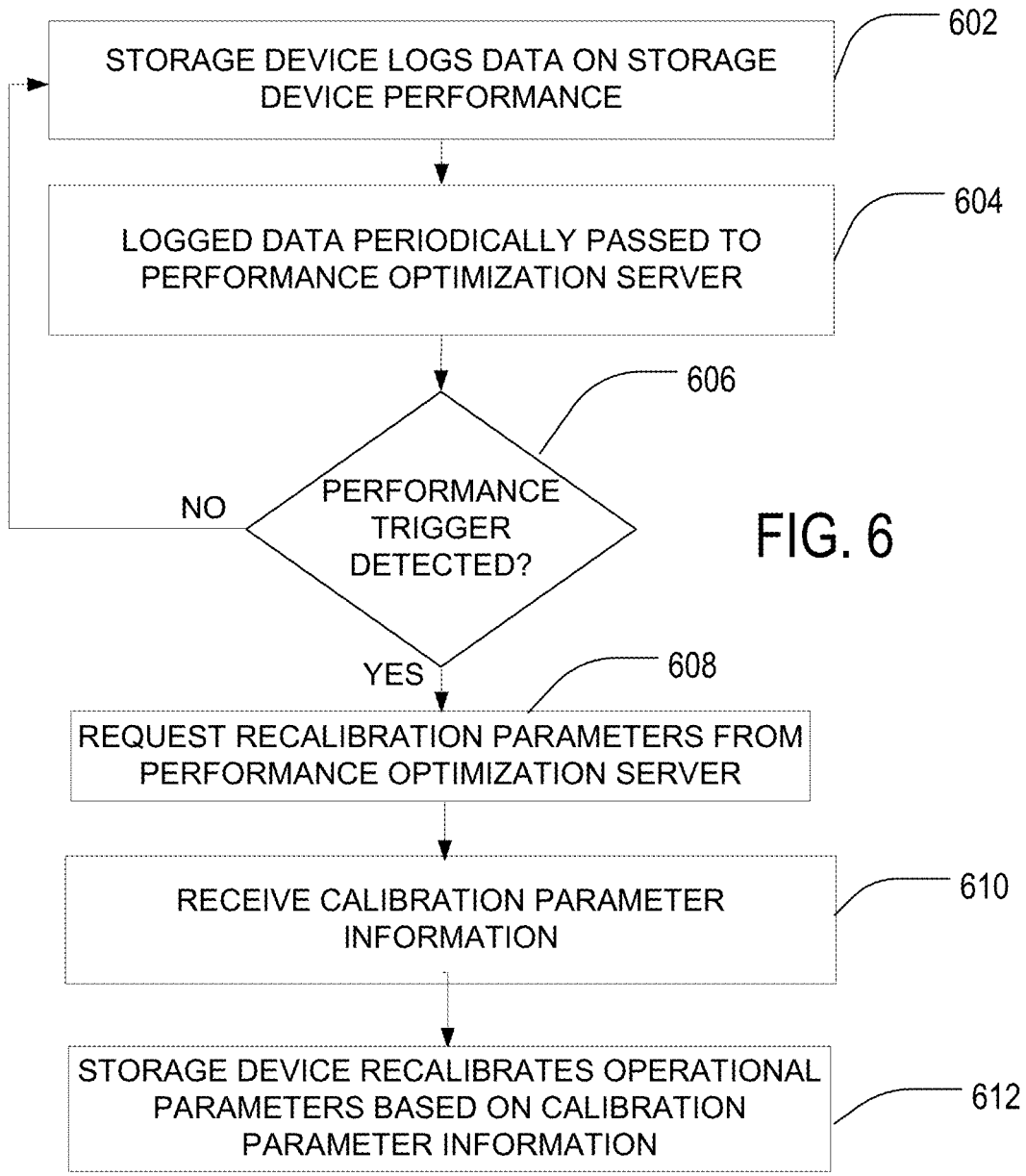

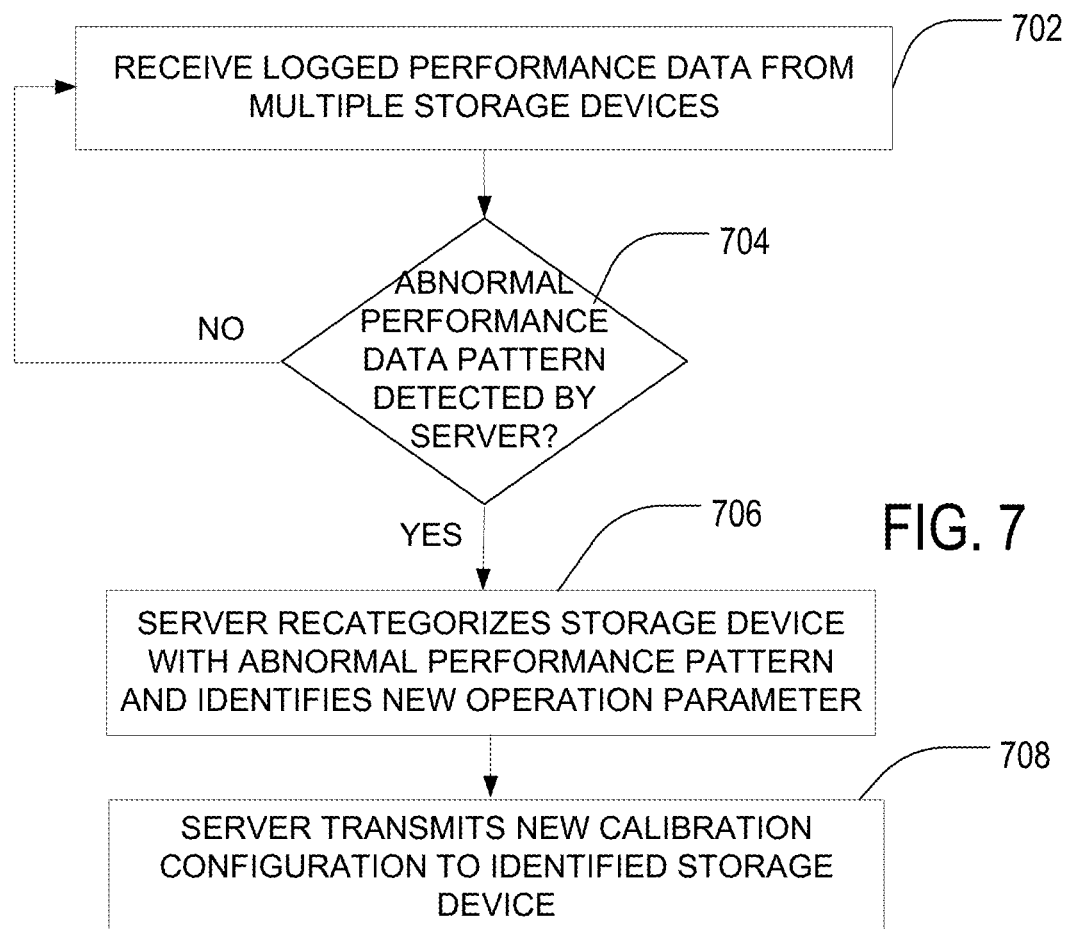

ADAPTIVE SYSTEM FOR OPTIMIZATION OF NON-VOLATILE STORAGE OPERATIONAL PARAMETERS

BACKGROUND

Storage systems, such as solid state drives (SSDs) including NAND flash memory, are commonly used in electronic systems ranging from consumer products to enterprise-level computer systems. The market for SSDs has increased and its acceptance for use by private enterprises or government agencies to store data is becoming more widespread. The type of workload and the age of a storage system may lead to the need to alter operating parameters to optimize performance of the storage system. The determination of when a particular set of operating parameters is best suited for a particular storage system can take a significant amount of data and time. Also, the process of changing operating parameters for a storage system in the field can be challenging.

BRIEF DESCRIPTION OF THE DRAWINGS

FIG. 6 is a flow diagram illustrating one implementation of managing operation parameters of a non-volatile memory system such as shown in FIG. 2.

FIG. 7 is a flow diagram illustrating a method of re-calibrating operating parameters of a memory system from a perspective of a crowdsourcing server such as shown in FIG. 2.

DETAILED DESCRIPTION

Figure 1:
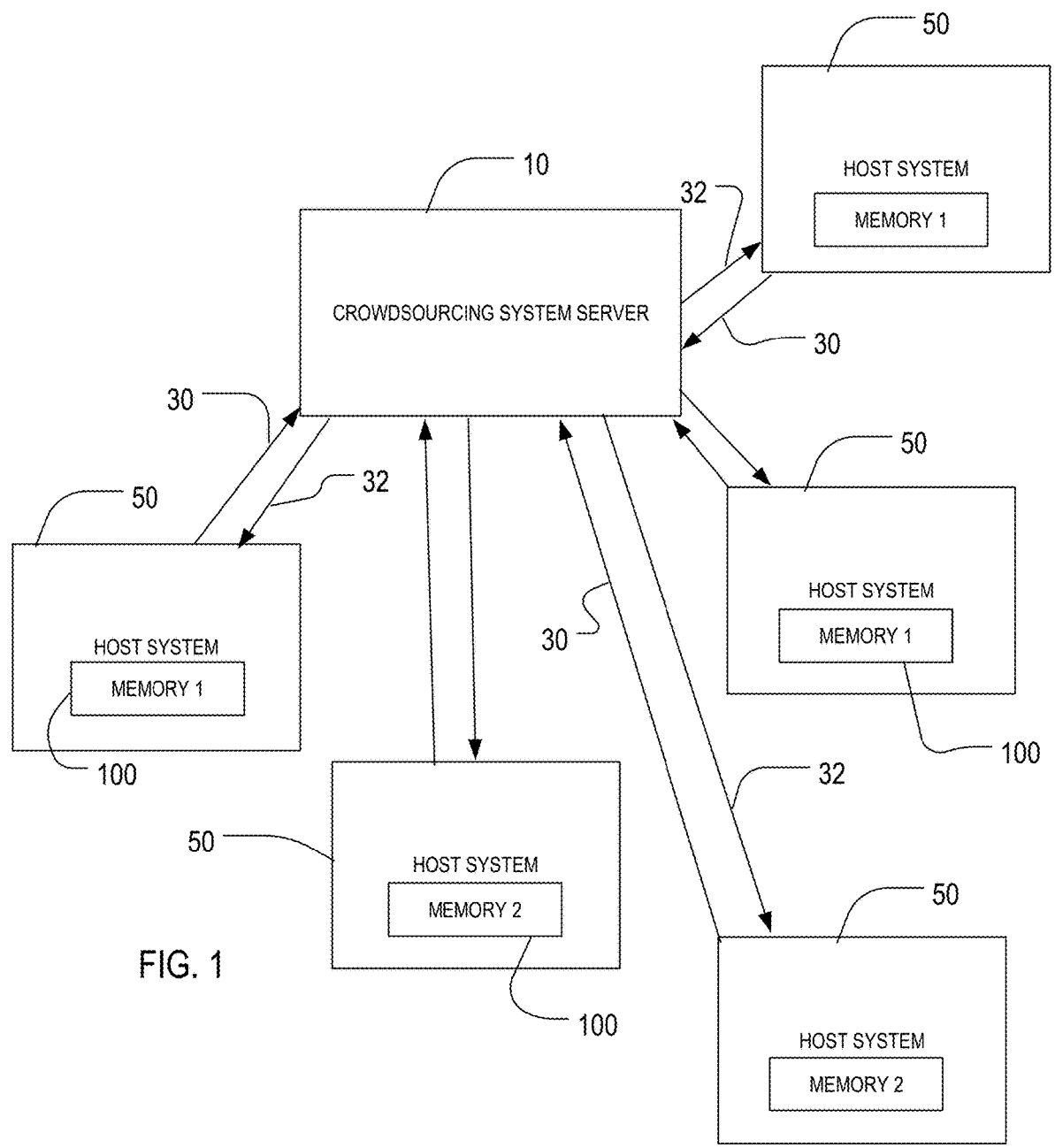
FIG. 1 is a block diagram of multiple host systems, each having a respective non-volatile memory system, in communication with a crowdsourcing server.

In order to address the challenges of adjusting the sets of non-volatile memory operating parameters used by various non-volatile memory systems that are already in the field, a system and method for dynamically selecting operating system parameters based on crowdsourced information gathered from other similar memory systems is described.

In the disclosed system and method, a crowdsourcing server may receive current operating information and status of multiple memory systems via communication from their respective host systems. For memory systems of a same type, for example memory systems using the same design or manufacturing run of semiconductor die, the crowdsourcing server may accumulate operating information. When the crowdsourcing server determines that the operating information from a particular memory system indicates that a different set of operating parameters would improve performance or life of that memory system, information regarding that new parameter set may be transmitted via the respective host system to the particular memory system. The crowdsourcing server may identify performance trends and optimal operating parameter sets of a particular memory system faster than the memory system itself because of the concurrent management and experience it gathers from other similar memory systems.

According to one aspect, a method for adjusting performance of a memory system is described. The method may include a controller of the memory system logging a predetermined set of performance measurements and the controller automatically transmitting to a memory system optimization server, via a host of the memory system, data logged for the performance measurements. The controller may detect a self-calibration trigger. In response to detecting the self-calibration trigger, the controller may transmit, via the host, a calibration update request to the memory system optimization server. The calibration update request causes the memory system optimization server to identify a memory system parameter, based on an assessment by the memory system optimization server of the data logged for the predetermined set of performance measurements and on crowdsourced information received from other memory systems by the memory system optimization server, and transmit a calibration update command to the memory system. The controller may then receive, in response to the calibration update request, the calibration update command from the memory system optimization server, where the calibration update command includes a memory system parameter identifier. The controller may then retrieve, based on the memory system parameter identifier, one memory system parameter from a plurality of predetermined memory system parameters previously stored in the memory system.

According to another aspect, a method of updating operating parameters of a first storage device based on performance characteristics of a plurality of storage devices is described. The method may include receiving at a memory system optimization server, also referred to herein as a crowdsourcing server, remotely located from a plurality of storage devices, periodic performance reports from the plurality of storage devices. The crowdsourcing server may monitor for an abnormal data pattern in the periodic performance reports from the plurality of storage devices. In response to identifying the abnormal data pattern in one of the plurality of storage devices, the crowdsourcing server may identify a preferred one of a predetermined number of operating parameter sets associated with the one of the plurality of storage devices based on performance data from other of the plurality of storage devices of a same type, and then transmit an operating parameter set identifier to the one of the plurality of storage devices instructing the one of the plurality of storage devices to change its operating parameters.

Referring to FIG. 1, a representation of plural host systems 50 communicating over uplink 30 and downlink 32 channels with a crowdsourcing system server 10, also referred to herein as a memory system optimization server, is shown. The memory system optimization server 10 may be remotely located from the various host systems 50. Communications over the uplink 30 and downlink 32 channels may take place on any of a number of wired and/or wireless connections linking the memory system optimization server and the particular host systems. Each host system may include one or more different types of memory systems 100, where two different memory types (MEMORY 1 and MEMORY 2) are shown simply by way of example. A memory system 100 of a same memory type includes memory having a same design or manufacturing run of semiconductor die as other memory systems of the same memory type. Other criteria for designating a memory a same memory type as another memory system may also be used. Each memory system 100, as described below, may be configured to provide performance data via its respective host system 50, and to receive operating system parameter updates from, the memory system optimization server.

Figure 2:
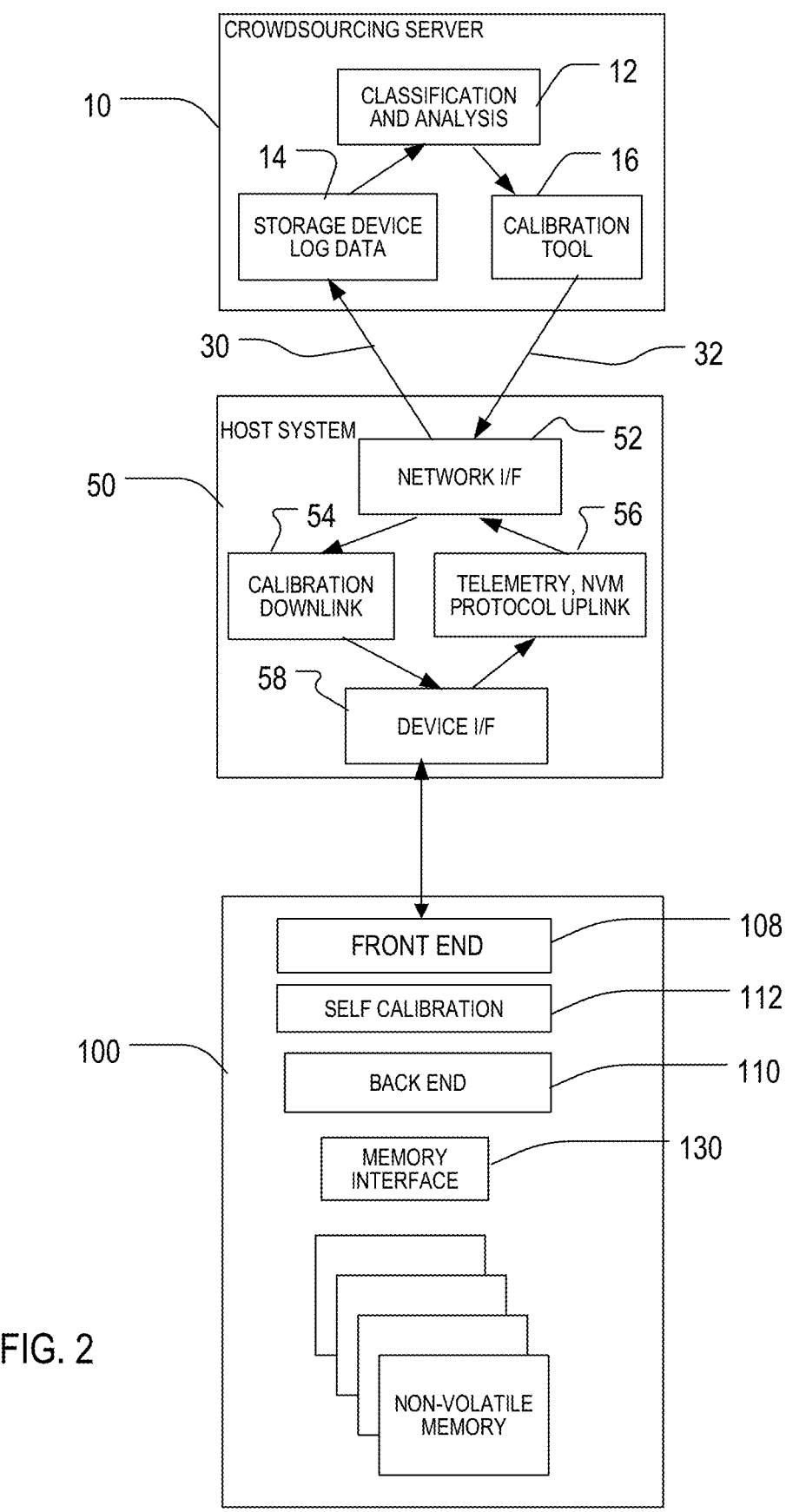
FIG. 2 is a block diagram of an expanded view of one host system of the system of FIG. 1 in communication with the crowdsource server of FIG. 1.

An portion of the system of FIG. 1 illustrating the crowdsourcing server 10 and a host system 50 with a single memory system 100 is shown in FIG. 2. The memory system optimization server 10 may include a classification and analysis module 12 that identifies the type of memory system 100 it is receiving performance data from and determines the optimal set of memory system operating parameters a particular memory system 100 should be using based on data the crowdsourcing server 100 has gathered from other memory systems of the same type. The crowdsourcing server may save and archive the memory system 100, also referred to herein as a storage device, log data received from different memory systems in a memory 14. The memory 14 may be any of a number of non-volatile or volatile memory types. The crowdsourcing server 10 may also include a calibration tool 16 to select and communicate the memory system operating parameter set best suited for a particular memory system based on the analysis module 12 determination. For example, calibration tool 16 may use a clustering algorithm based on a large sample size of devices with an initial variable set of parameters, in which the operating parameters most effective according to the collected telemetry from the devices is selected for similar devices in the same cluster. The tool may also calculate parameters based on raw memory data collected offline after the devices were released—for example, read thresholds determined to be most effective in memory testing after the initial release of devices may be updated to similar devices.

Each host system 50 may include a network interface (I/F) 52 for communicating with the crowdsourcing server 10. A calibration data downlink module 54 and a module 56 for relaying telemetry and non-volatile memory uplink communication may be included. Additionally, a device I/F 58 is included for communication with the memory system 100. In one implementation, the uplink channel 30 may be based on an existing error communication utilizing an existing error reporting format, such as the NVMe 1.2 or 1.3 host controller specification published by NVM Express Inc. and available from the NVM Express Workgroup do Virtual, Inc. of Wakefield, Mass. The downlink channel 32 may utilize a known protocol for downloading the operating parameter set indicator, or actual operating parameter set data, from the crowdsourcing server 10 to the storage device 100. One suitable protocol for use over the downlink channel 32 is field firmware update (FFU) protocol, although any of a number of update protocols may be used.

The memory system 100 may be a non-volatile storage device including a front end 100 and a self-calibration 112 module for changing and updating operating parameters based on calibration data from the calibration tool 16 of the crowdsourcing server 10. The memory system may further include a backend 110 and a memory interface 130 that control the operation and use of the non-volatile memory of the memory system. More details on different arrangements and content of the non-volatile memory system 100 are described with respect to FIGS. 3A-3C below.

Figure 3A:
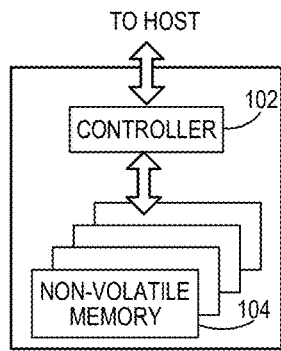
FIG. 3A is a block diagram of an example non-volatile memory system.

Referring now to FIG. 3A, a block diagram illustrating the non-volatile memory system 100 is shown. The non-volatile memory (NVM) system 100 includes a controller 102 and non-volatile memory 104 that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card-based system, such as a secure digital (SD) or a micro secure digital (micro-SD) card. In an alternate embodiment, memory system 100 may be part of an embedded memory system.

Although in the example illustrated in FIG. 3A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 3B:
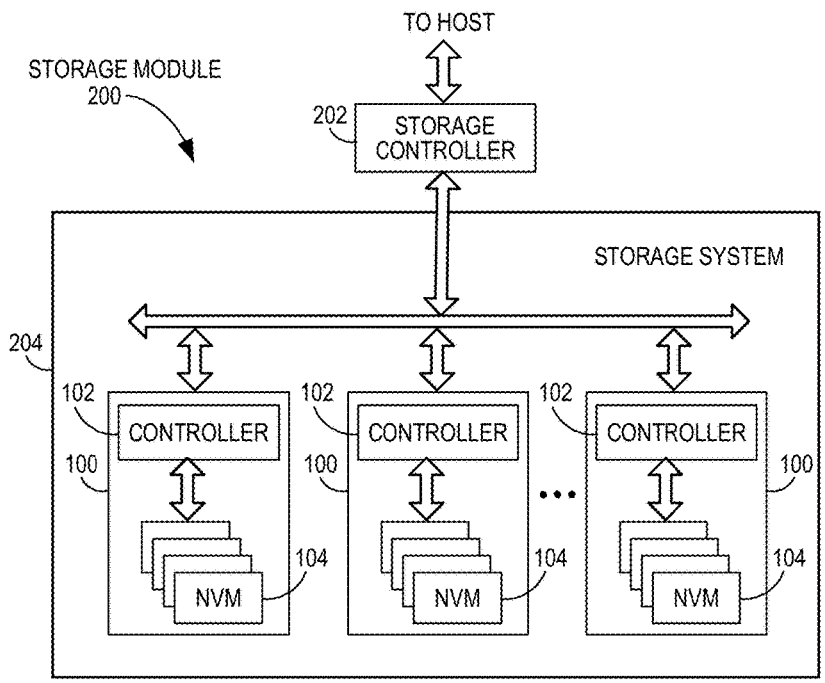
FIG. 3B is a block diagram illustrating an exemplary storage module.

FIG. 3B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 3C:
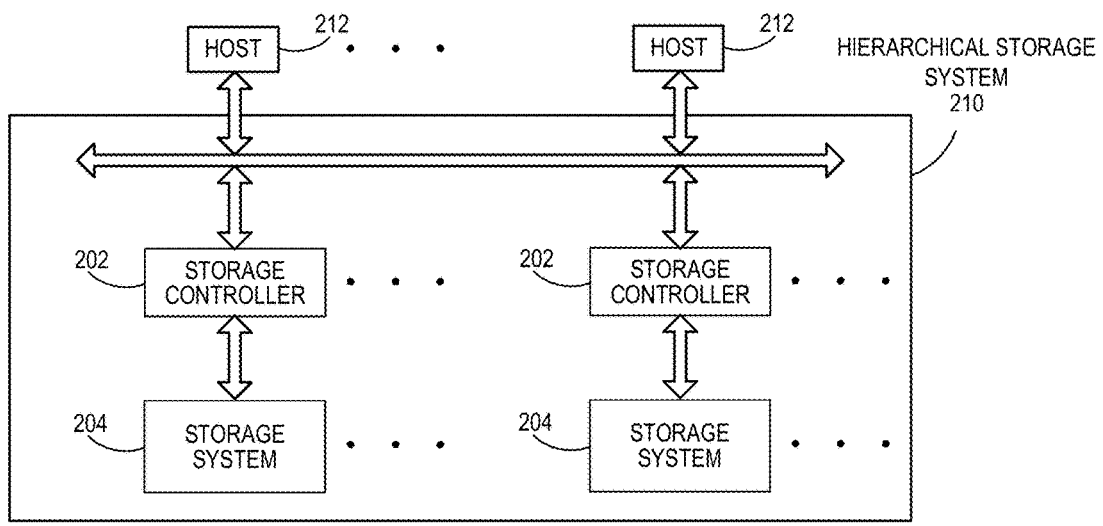
FIG. 3C is a block diagram illustrating a hierarchical storage system.

FIG. 3C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 4A:
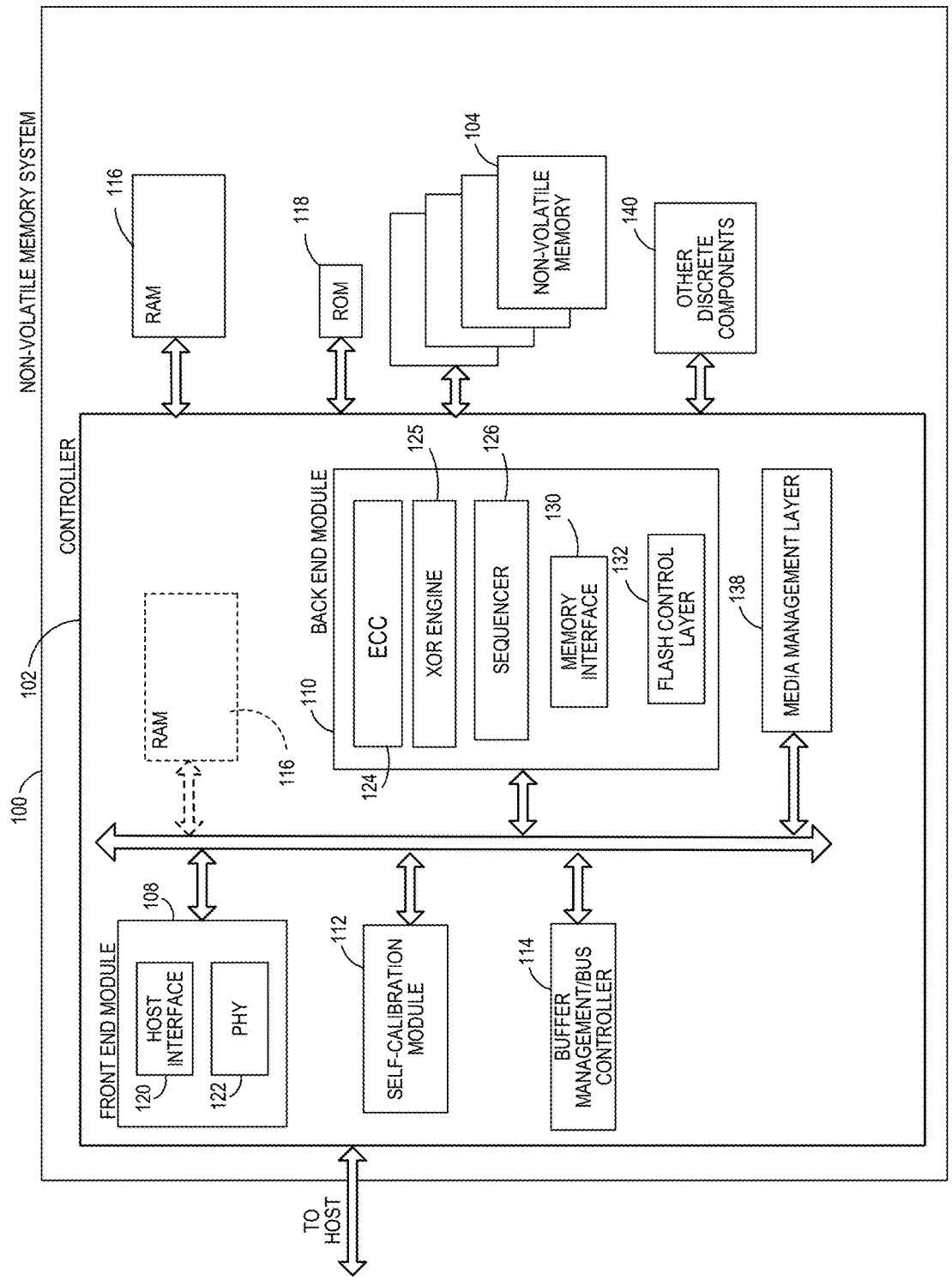
FIG. 4A is a block diagram illustrating exemplary components of a controller of a non-volatile memory system.

FIG. 4A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a sub-drive data routing module 112 present on the die of the controller 102. As described below, the self-calibration module 112, in cooperation with the controller, may provide functionality for transmitting operating and/or performance parameters over an uplink channel 30 via the host 50 to a crowdsourcing server 10. The self-calibration module 112 may also contain functionality for identifying trigger points where performance of the memory system falls below a predetermined threshold and an update request for updated operating parameters may be generated. Additionally, the self-calibration module 112 may include downlink management protocols for receiving and implementing operating parameter information from the crowdsourcing server 10.

A buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die. The RAM 116 may be any of one or more types of RAM, such as SRAM or DRAM.

The RAM 116 in the NVM system 100, whether outside the controller 102, inside the controller or present both outside and inside the controller 102, may contain a number of items, including a copy of one or more pieces of the logical-to-physical mapping tables for the NVM system 100. The RAM 116 may contain logged non-volatile memory performance data gathered by the controller 102.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory 104.

The ECC applied to the host data to create the codewords may be any one of several types of ECC, such as BCH codes (or other cyclic error-correcting codes) or low-density parity check (LDPC) codes which are useful to recover high numbers of error bits, where errors may come from individual memory cells. It is contemplated that this type of ECC is applied by the ECC engine 124 and used last before programming and first when reading.

A command sequencer 126 generates command sequences, such as program and erase command sequences, to be transmitted to non-volatile memory die 104. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 4A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, media management layer 138 and buffer management/bus controller 114 are optional components that are not necessary in the controller 102.

Figure 4B:
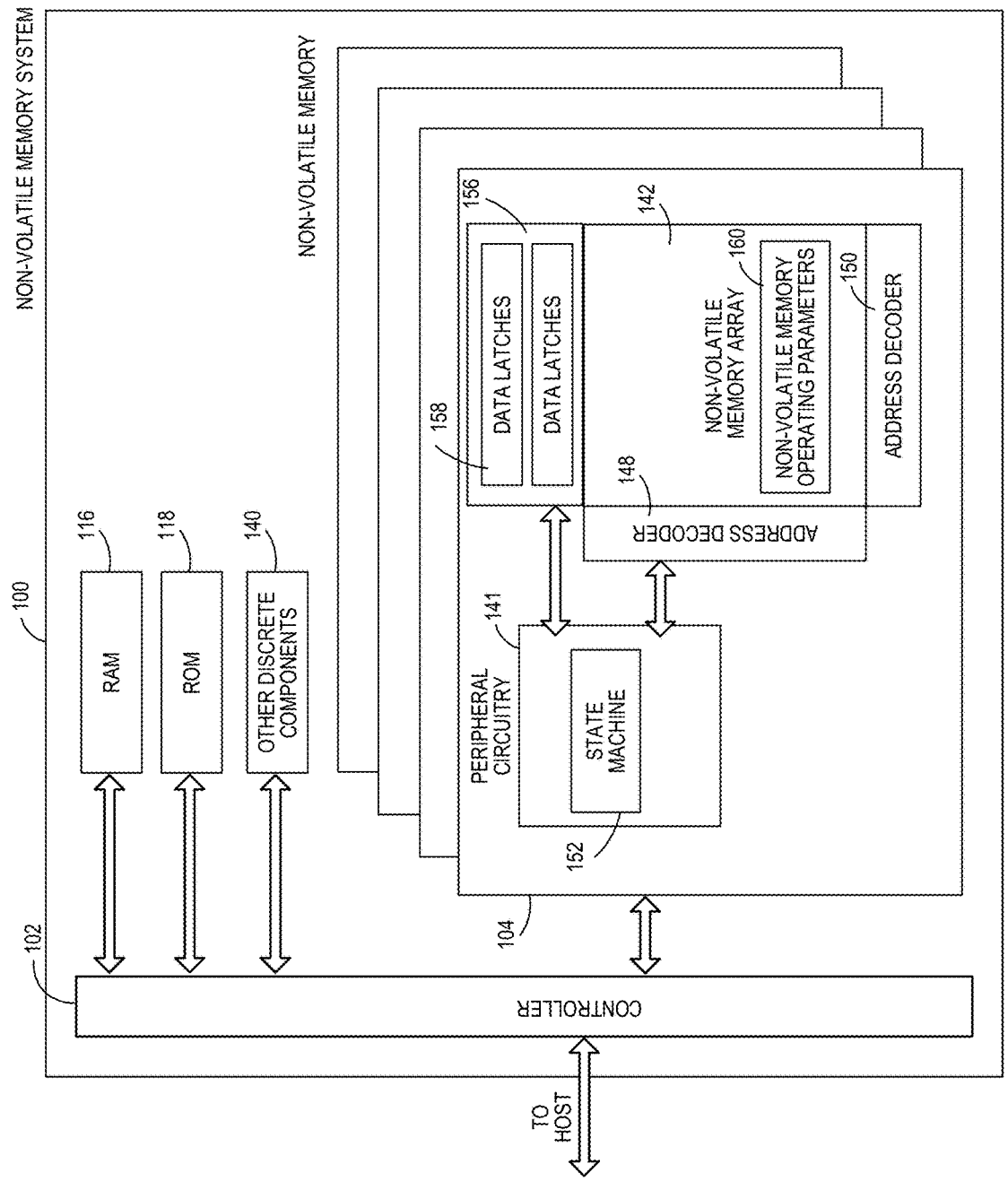
FIG. 4B is a block diagram illustrating exemplary components of a non-volatile memory of a non-volatile memory storage system.

FIG. 4B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two-dimensional and/or three-dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

The sets of pre-stored and pre-qualified non-volatile memory operating parameters 160 discussed herein may be stored in non-volatile memory 104 and copied to RAM 116 as needed. In one implementation, the pre-stored and pre-qualified operating parameters are arranged in a data structure having identifiers or other indicia associated with each different set or portion of a set of operating parameters. These identifiers or other indicia may be used by the self-calibration module 112 to retrieve the appropriate operating parameters identified by the crowdsourcing server 10.

Figure 5:
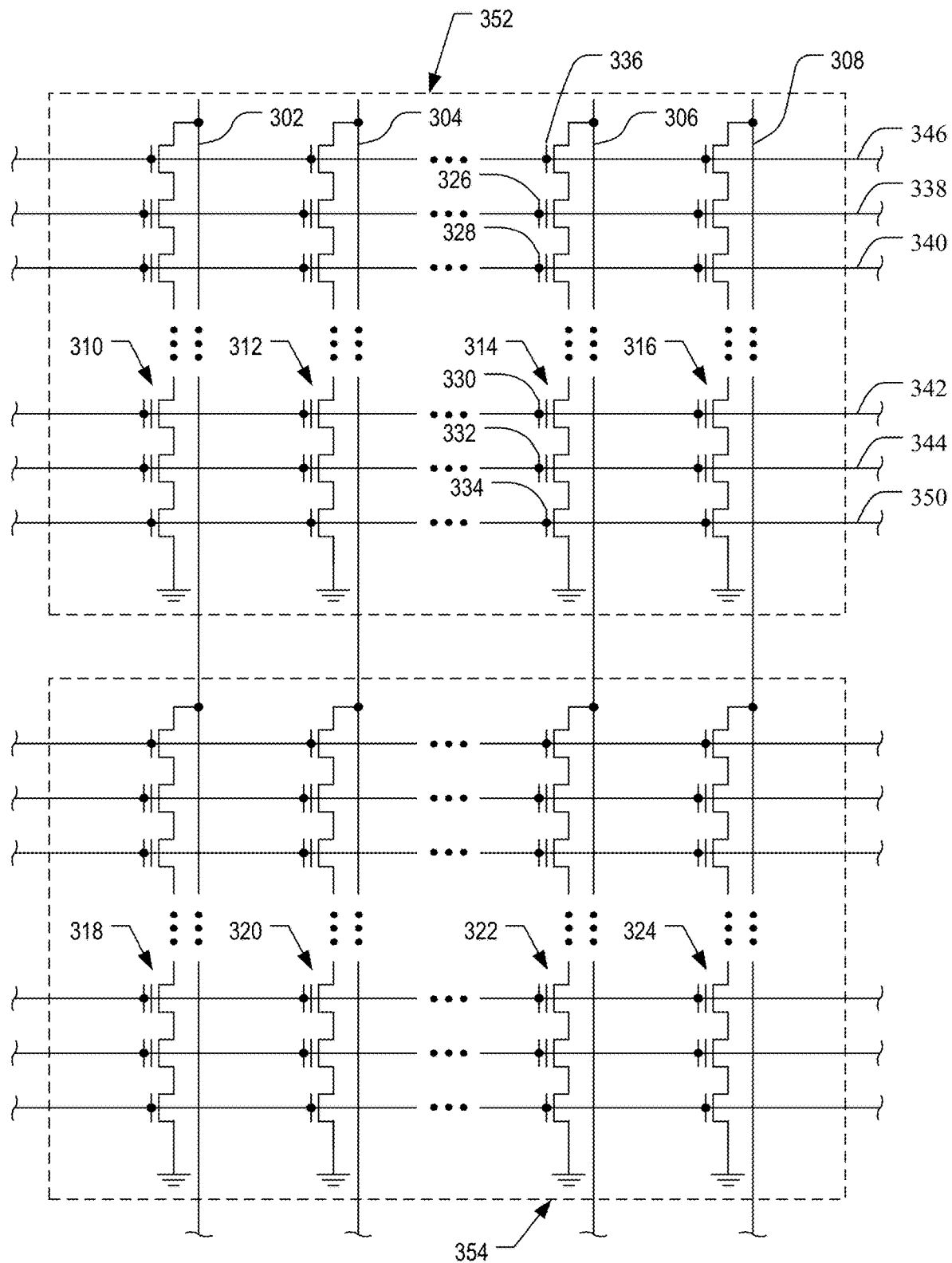
FIG. 5 is an example of a non-volatile memory circuit array illustrating block and word line arrangements.

An example NAND array is illustrated in FIG. 5. While a large number of global bit lines are provided in a NAND array, only four such lines 302-308 are shown in FIG. 5 for simplicity of explanation. A number of series connected memory cell strings 310-324 are connected between one of these bit lines and a reference potential. Using the memory cell string 314 as representative, a plurality of charge storage memory cells 326-332 are connected in series with select transistors 334 and 336 at either end of the string. When the select transistors of a string are rendered conductive, the string is connected between its bit line and the reference potential. One memory cell within that string is then programmed or read at a time.

Word lines 338-344 of FIG. 5 individually extend across the charge storage element of one memory cell in each of a number of strings of memory cells, and gates 346 and 350 control the states of the select transistors at each end of the strings. The memory cell strings that share common word and control gate lines 338-350 are made to form a block 352 of memory cells that are erased together. This block of cells contains the minimum number of cells that are physically erasable at one time. One row of memory cells, those along one of the word lines 338-344, are programmed at a time. Conventionally, the rows of a NAND array are programmed in a prescribed sequential order, in this case beginning with the row along the word line 344 closest to the end of the strings connected to ground or another common potential. The row of memory cells along the word line 342 is programmed next, and so on, throughout the block 352.

A second block 354 is similar, its strings of memory cells being connected to the same global bit lines as the strings in the first block 352 but having a different set of word and control gate lines. The word and control gate lines are driven to their proper operating voltages by row control circuits. If there is more than one plane in the system, one memory architecture uses common word lines extending between them. There can alternatively be more than two planes that share common word lines. In other memory architectures, the word lines of individual planes are separately driven. While the example NAND array illustrated in FIG. 5 has been used to describe a process for writing data to a memory block in a forward direction, to write data to a memory block in either a forward direction or a reverse direction, a controller may change which end of the memory cell strings is connected is connected a ground or other common potential.

The non-volatile flash memory array 142 in the non-volatile memory 104 may be arranged in blocks of memory cells as illustrated above where a block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock.

The blocks disclosed in FIG. 5 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

The systems described above may be configured to self-calibrate memory system parameters as indicated in FIG. 6. The storage device 100 may log certain data on its performance and current settings (at 602). The logged information may include program/erase cycle counts (average for device or within smaller granularity amounts such as for each time tagged group of blocks or word lines), error correction code type and performance, latency, current storage device operating parameter identification and/or any of a number of other types of information.

The logged data may be of a consistent type or group of data, or the types of data logged may vary dynamically based on the current state of the storage device 100. Periodically, the self-calibration module 112 and controller 102 may pass some or all of the logged performance and other parameter data to the crowdsourcing server 10 (at 604). The periodicity may be at fixed times, for example only at power up of the storage device 100 or only after a certain number of memory operations such as program/erase cycle counts, or at other predetermined intervals, or may be transmitted at variable times that may depend on a rate of change of performance detected. When the self-calibration module 112 detects a performance trigger relating to a change in performance (at 606), it may then send via the host system a recalibration request to the crowdsourcing server (at 608). The performance trigger may be a predetermined change in error correction code (ECC) performance, such as an increase in the amount of time that error correction procedures are necessary to correct for an increase in errors. Any of a number of other recalibration triggers may also be implemented.

When the calibration request is sent to the crowdsourcing server 10, it may be accompanied by a storage device identifier so that the crowdsourcing server can both identify the particular storage device that has sent the request and the storage device type that it will compare the data to. The crowdsourcing server 10 may identify the classification or type of storage device for purposes of reviewing the current operating status of the particular storage device 100 and for utilizing the data of other storage device operating parameters and resulting performance parameters that it has accumulated. Once the crowdsourcing server 10 has determined what the best operating parameters will be for the storage device 100, based on performance data it has gathered from other storage devices of the same type, it will identify the closest set of parameters that the crowdsourcing server knows are present on the particular storage device and the storage device 100 will receive those recalibration parameters (at 610). In one implementation, although the crowdsourcing server 10 may identify the optimal settings for various operating parameters for a particular storage device 100, the ideal parameters may not be pre-approved parameters. Thus, the crowdsourcing server 10 may select the closest match to those optimal settings from the available pre-defined parameter sets for that type of storage device 100.

In one embodiment, each storage device 100 has a plurality of pre-qualified, pre-stored operating parameters. These parameter sets are considered pre-qualified when they have been tested, for example prior to manufacture and sale of the storage device 100, so that the parameters are known to work on the storage device without causing errors or other performance problems. The operating parameters in a particular operating parameter set may include one or more different non-volatile memory operating parameters. For example, a non-limiting list of potential parameters that may be in a given operating parameter set may include non-volatile memory read thresholds (e.g. the voltage width that is used to define each state of a non-volatile memory cell in the non-volatile memory), the particular sequence of steps used for error recovery in the non-volatile memory, the strength of the error correction code (ECC) being used (e.g. the particular ECC algorithm type being used), Log-Likelihood Ratio (LLR) tables optimal for the memory in the particular device, timeout and iteration parameters for each stage of decoding, or the ECC parameters for the ECC engine of the storage device. Each operating parameter set may be a group of different operating parameters, or just a single parameter.

Also, the operating parameter sets may already be pre-set in the storage device 100 to be implemented by the self-calibration module 112 in a predetermined order. The pre-determined order of implementation of the pre-stored operating parameter sets may be based on, for example, device age measured in average program/erase cycle counts for all or part of the non-volatile memory cells. In one implementation, the recalibration data received from the crowdsourcing server 10 may accelerate or slow down when of the pre-stored operating parameter sets would otherwise be implemented in the pre-established sequence. In other implementations, the crowdsourcing server 10 may instruct the storage device 100 to select pre-stored parameter sets out of order such that any pre-established sequence of implementation that the storage device 100 would otherwise have progressed through is bypassed. Thus, certain pre-stored parameter sets may be entirely skipped or bypassed based on the crowdsourcing data of actual field use that other similar storage devices are providing to the crowdsourcing server 10.

In one implementation, the operating parameter set selected by the crowdsourcing server 10 based on the inputs and results of other related storage devices of the same class may be identified to the storage device 100 by a number, letter or other identifier. This identifier may be sent over the downlink 32 from the crowdsourcing server, rather than the actual parameter set itself, to the storage device 100 via the respective host 50. Upon receipt of the identifier, the self-calibration module 112, in cooperation with the controller 102, may retrieve the associated operating parameter set from a non-volatile memory 104 or other storage location in the storage device 100. The retrieved parameter set may then be used by the self-calibration module 112 to update the storage device operating parameters. In other implementations, the entire operating parameter set may be downloaded via the downlink 32 and the host 50 for implementation by the storage device 100. The storage device 100 may update its operating parameters with the received or retrieved operating parameters during a next idle time of the storage device 100 (at 612). It should be noted that the self-calibration module 112 of the storage device 100 may include self-checking routines configured to guarantee proper operation with re-calibrated parameters that the crowdsourcing server 10 has identified or supplied.

With respect to the self-calibration process implemented by the storage device 100, the process may be automatic after receipt of the operating parameter set information in one implementation. In other implementations, a user may first be queried by the host 50 to approve an update of the storage device to implement the new operating parameters.

Referring to FIG. 7, in an alternative embodiment the crowdsourcing server 10 may make the determination as to when a recalibration trigger has been reached rather than the storage device 100. The received logged performance data may come in from the various storage devices via their respective hosts over the uplink channel 30 as described previously (at 702). Instead of a recalibration trigger being detected by the storage device 100 and the storage device querying the crowdsourcing server 10 for recalibration data (e.g., for operating parameter set information) as described above, the crowdsourcing server 10 may detect abnormal performance patterns from the received logged performance data for a particular storage device 100 (at 704). The abnormal patterns may be any one of more of various performance criteria that have fallen below (or above) an expected threshold. For example, an increase in error correction time or general operation execution time, a leakage current that exceeds a desired amount, a memory cell wear measurement and/or other select criteria may be used as part of the abnormal pattern recognition for the particular storage device 100 by the crowdsourcing server 10.

In yet other implementations, the storage device may send a recalibration request to the crowdsourcing server when the storage device identifies a performance threshold or other issue and the crowdsourcing server may also send down re-calibration commands with operating parameter set information at other times when it identifies abnormalities or inefficiencies in the performance parameters of the storage device as compared to pre-set threshold or comparative storage device performance.

At this stage, the crowdsourcing server 10 may then re-categorize the particular storage device 100 to another performance stage for that class of storage device using information it has gathered from other same type storage devices regarding performance measurements and results of other operating parameter sets in use on those other same type storage devices 100. The crowdsourcing server 10 may then identify the best one of the pre-stored operating parameter sets that it knows are present on the storage device 100 based on the current crowdsource information on other storage devices of the same type (at 706). In order to decide on the optimal set of parameters, and then choose from the available pre-stored operational parameter sets on the particular type of storage device, the crowdsourcing server 10 may use any of a number of big data methods, such as data mining, machine learning or the like, to classify and analyze received data from the plurality of storage devices it communicates with. Once the desired parameter set is identified by the crowdsourcing server 10, the crowdsourcing server 10 transmits the new calibration configuration (for example, operating parameter set identifier information) to the storage device 100 via the host 50 (at 708).

As described above, the upload of logged information from each storage device 100 takes place via the respective host 50 of the storage device. Although any of a number of protocols and formats may be used by the storage device to transmit logged performance data to the crowdsourcing server, use of an existing protocol may be implemented. For example, the telemetry protocol defined in the NVM Express 1.3 standard for use in transmitting error information may be coopted to send the performance data via an uplink through the respective host of the storage device. Each uplinked message would include storage device specific identifier and host location data that allows the crowdsourcing serve to determine the typed of storage device and an address for future communication to that storage device via the host. On the downlink side, the crowdsourcing server may use a firmware update protocol, such as flash firmware update (FFU) to transmit the recalibration information for the desired operating parameter set.

The number of different types of data that a storage device can measure and log may be greater than the number of types of data the storage device chooses to upload to the crowdsourcing server. For example, the logged parameters stored locally on a storage device may include program/erase cycles, bit error rate (BER) levels and/or an uncorrectable error correction code (UECC) count, peak bit error rate, the grown number of bad blocks in the storage device, peak and average power measurements (e.g., power consumption), throughput and latency data, and leakage current. Throughput may be measure in terms of average latency (number of operations per unit time) and latency may be defined as the time each operation (e.g. a read or a write) takes. Of this larger set of data that may be logged, only a select portion may be sent by the storage device over the uplink via the host system to the crowdsourcing server.

As one example of using the power of a crowdsourcing server to optimize the operational parameters of a group of storage devices of a same type, a time tag example is now described. In a non-volatile memory such as the non-volatile memory of FIG. 4A, the controller 102 may identify a set of blocks that have been used under the same conditions and at the same time with separate tags, referred to as time tags. Each of the blocks assigned the same time tag may be processed with a different set of operating parameters than those used for blocks in the storage device that are associated with other time tags. For example, blocks assigned a first time tag may have a different read threshold voltage than blocks assigned to a second or third time tag in the storage device representing a different amount of read and write usage. However, if there are 20,000 blocks assigned to a particular time tag, the storage device may not realistically be able to read all of the blocks associated with a particular time tag then average and use a determined optimal read threshold (e.g. a change in operating parameters) on its own. Instead, the storage device would typically use an average read threshold of the small portion of blocks associated with the time tag and use that average to determine the read threshold or other operating parameter that matches the measured average. By utilizing the crowdsourcing server 10 and its access to logged performance data of many storage devices of a same class as described above in the implementations of FIG. 6 or 7, the crowdsourcing server 10 can more quickly assess an average performance and resulting optimal operating parameter set for a device.

Figure 8A:
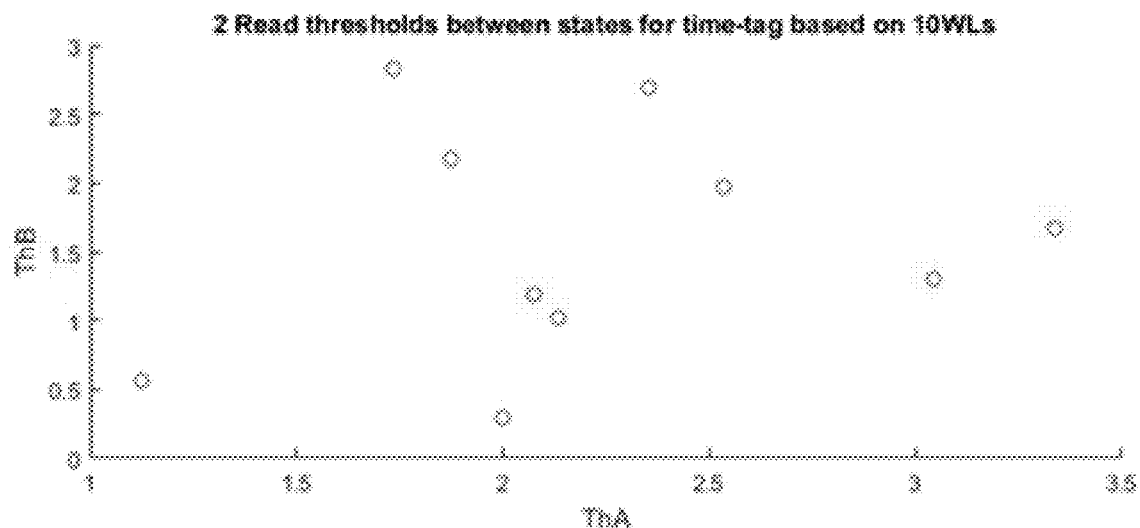
FIG. 8A is a hypothetical read threshold plot for time tagged based groups of blocks with 10 word lines of read threshold data.
Figure 8B:
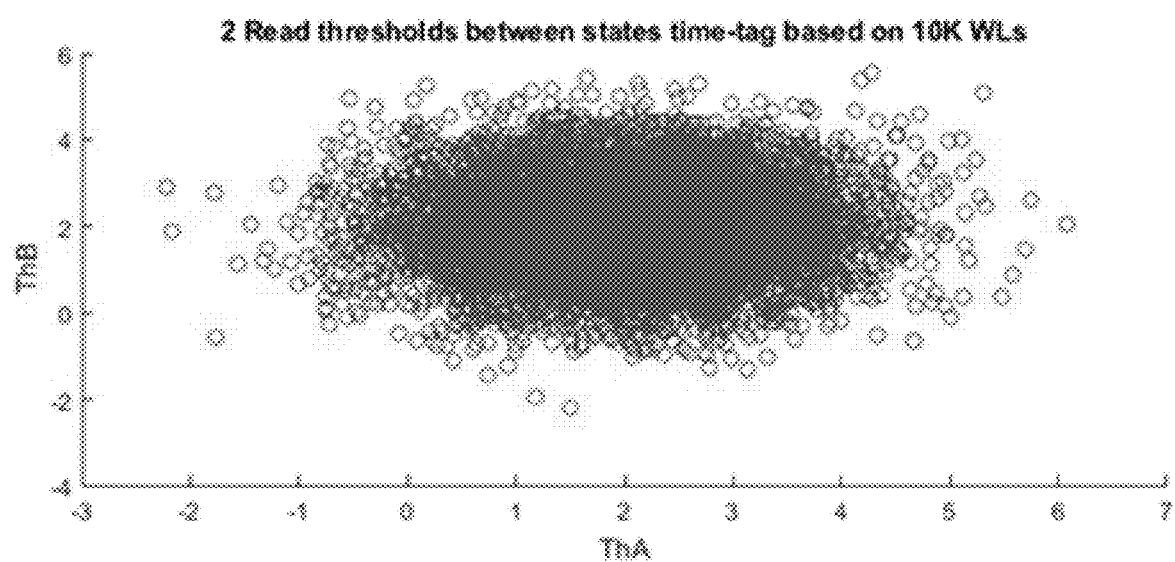
FIG. 8B is a hypothetical read threshold plot for time tagged based groups of blocks with 10,000 word lines of read threshold data gathered from multiple different non-volatile memory systems of a same type.

As shown in FIGS. 8A and 8B, a hypothetical distribution of read voltages of ten word lines of a single storage device 100 is shown in FIG. 8A, while a hypothetical combined read voltage distribution received for ten thousand word lines from a plurality of storage devices 100 of a same type is seen in FIG. 8B. The crowdsourcing server 10, by collecting and aggregating the word line read level data received from multiple storage devise of a same type, can more quickly provide optimized operating parameter information to a particular storage device 100. It is contemplated that the performance and endurance of a storage device 100 may be improved by fine tuning the operating parameters based on the crowdsource analysis of many storage devices of a same type as compared to the longer time any single storage device would need to aggregate statistically significant data on performance from its own performance data. The example of the time tagged groups of word lines (or blocks) noted above for purposes of optimizing the read voltage operating parameters is just one type of operating parameter that may be optimized via crowdsourcing. Other parameters of a particular storage device 100 may also be optimized using dynamic data gathered and analyzed for similar type storage devices. ECC decoding algorithms or modes, and any of a number of other parameters, may also be optimized in different implementations.

Also, to reduce the time needed to qualify parameter sets that will work on devices already in the field, the use and selection of pre-stored parameter sets that were pre-qualified at the time of manufacture as working for the particular storage device may improve flexibility of adjustment and development time for manufacturing storage devices. The use of existing error reporting protocols for transmitting performance data logged by devices to a crowdsourcing server 10 via an uplink path 30 may reduce the need for additional protocols and programming in each storage device 100. Similarly, the use of an existing firmware update protocol to carry operating parameter identifiers of pre-stored operating parameter sets back from the crowdsourcing server 10 to the storage device 100 may reduce the need for additional customized programming and the bandwidth needed over the downlink path 32.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

Methods and systems have been disclosed for storage devices to transmit logged performance data to a crowdsourcing server and receive operating parameter recalibration data or identifiers for self-calibrating the operating parameters of the storage device based on crowdsourced information from other similar type storage devices in communication with the crowdsourcing server. The storage device may recognize a performance-based trigger for requesting operating parameter updates, or the crowdsourcing server may identify abnormal patterns of performance from the logged data and initiate transmission of operating parameter update information to a particular storage device. The uplink protocol for passing logged performance data may be an existing protocol typically used for other purposes, such as an error reporting protocol. The downlink from crowdsourcing server to the storage device may use a firmware update protocol or other suitable protocol. Pre-stored and pre-qualified sets of operating parameters on the storage devices may be identified by the crowdsourcing server so that changes to operating parameters may be made safely and quickly to storage devices in the field. The crowdsourcing server may have identifiers, for each storage device type, of the pre-stored and pre-qualified operating parameter sets that it can send over the downlink to cause the storage device to retrieve from its local storage. The storage device may then self-calibrate to update its operating parameters after receiving the data from the crowdsourcing server.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A method for adjusting performance of a solid state drive, the method comprising:
   a controller of the solid state drive logging a predetermined set of performance measurements of non-volatile memories of the solid state drive, wherein the solid state drive comprises the controller;
   the controller automatically transmitting to a non-volatile memory optimization server, via a host of the solid state drive, data logged for the predetermined set of performance measurements;
   detecting a self-calibration trigger; and
   in response to detecting the self-calibration trigger:
      the solid state drive transmitting, via the host, a calibration update request to the non-volatile memory optimization server, wherein the calibration update request causes the non-volatile memory optimization server to:
         identify a non-volatile memory operating parameter from a first plurality of predetermined non-volatile memory operating parameters previously stored in the non-volatile memory optimization server, based on an assessment by the non-volatile memory optimization server of the data logged for the predetermined set of performance measurements and on crowdsourced information received from other solid state drives by the non-volatile memory optimization server, wherein the crowdsourced information is data of performance measurements of non-volatile memories of the other solid state drives; and
         transmit a calibration update command to the solid state drive without transmitting the identified non-volatile memory operating parameter of the first plurality of predetermined non-volatile memory operating parameters;
      the solid state drive receiving, in response to the calibration update request, the calibration update command from the non-volatile memory optimization server, the calibration update command comprising a non-volatile memory operating parameter identifier identified by the non-volatile memory optimization server, wherein the non-volatile memory operating parameter identifier is associated with the non-volatile memory operating parameter; and
      the solid state drive retrieving, using the non-volatile memory operating parameter identifier, one non-volatile memory operating parameter identified by the non-volatile memory operating parameter identifier, from a second plurality of predetermined non-volatile memory operating parameters previously stored in the solid state drive, wherein the non-volatile memory operating parameter identifier is based on the data logged for the predetermined set of performance measurements of non-volatile memories of the solid state drive and the data of performance measurements of non-volatile memories of the other solid state drives,
   wherein the solid state drive, the other solid state drives, the host, and the non-volatile memory optimization server are separate and distinct from one another, wherein the non-volatile memory optimization server is outside the solid state drive, wherein the first and second pluralities of predetermined non-volatile memory operating parameters are for non-volatile memories and comprise non-volatile memory read thresholds, a sequence of steps for error recovery, and error correction code parameters.

2. The method of claim 1, wherein:
   each of the second plurality of predetermined non-volatile memory operating parameters comprises a respective set of memory operation settings; and
   retrieving the one non-volatile memory operating parameter previously stored in the solid state drive comprises retrieving the respective set of memory operation settings,
   wherein the controller automatically transmitting the data logged comprises automatically transmitting at predetermined time intervals at least a portion of the data logged.

3. The method of claim 1, wherein logging the predetermined set of performance measurements comprises measuring at least one of: program/erase cycles, peak bit error rate, uncorrectable error correction code (UECC) instances, grown bad block number, power consumption, read or write latency, or leakage current for the solid state drive, and
   wherein the data of performance measurements of non-volatile memories of the other solid state drives comprises one or more of: program/erase cycles, peak bit error rate, uncorrectable error correction code (UECC)

instances, grown bad block number, power consumption, read or write latency, or leakage current for the other solid state drives.

4. The method of claim 1, wherein detecting the self-calibration trigger comprises identifying at least one performance measurement that has reached a predetermined threshold.

5. The method of claim 1, further comprising the controller recalibrating, during an idle time at the solid state drive, at least one memory operation setting of the solid state drive with the one non-volatile memory operating parameter retrieved from the solid state drive,
wherein the controller recalibrates the at least one memory operation setting as part of a firmware update process.

6. The method of claim 5, wherein recalibrating the at least one memory operation setting comprises changing a read threshold level for the solid state drive.

7. The method of claim 5, wherein recalibrating the at least one memory operation setting comprises changing an error correction code (ECC) decoding mode for the solid state drive.

8. The method of claim 1, wherein the second plurality of predetermined non-volatile memory operating parameters comprises operating parameter sets, wherein the solid state drive comprises a predetermined order of implementation of the operating parameter sets, wherein the calibration update command from the non-volatile memory optimization server causes at least one of: accelerating or decelerating when to implement the predetermined order; selecting one or more of the operating parameter sets out of order; or skipping implementation of one or more of the operating parameter sets.

9. The method of claim 1, wherein in response to detecting the self-calibration trigger: the calibration update request causes the non-volatile memory optimization server to change a category of the solid state drive from a first performance stage to a second performance stage based on the data of performance measurements of non-volatile memories of the other solid state drives, wherein the solid state drive and the other solid state drives are of a same type of storage device.

10. The method of claim 1, wherein the one non-volatile memory operating parameter is one of pre-stored and pre-qualified operating parameter sets previously stored in the solid state drive, wherein a pre-qualified operating parameter is a parameter that has been pre-determined to work on the solid state drive prior to logging the predetermined set of performance measurements of non-volatile memories of the solid state drive.

11. The method of claim 1, wherein the controller assigns a same time tag to a plurality of blocks in non-volatile memories of the solid state drive, wherein the data transmitted to the non-volatile memory optimization server has been logged from only a portion of the plurality of blocks having the same time tag, and wherein the remaining portion of the plurality of blocks having the same time tag is prevented from providing data of performance measurements to be transmitted to the non-volatile memory optimization server.

12. A non-volatile memory device comprising:
non-volatile memory having a plurality of non-volatile memory operating parameter sets stored therein; and
a controller configured to be in communication with the non-volatile memory, the controller configured to:
perform memory operations in accordance with a first of the plurality of non-volatile memory operating parameter sets;
periodically transmit logged internal memory performance data of the non-volatile memory device, via a host, to a non-volatile memory optimization server;
monitor the logged internal memory performance data for a self-calibration trigger event; and
in response to detection of the self-calibration trigger event:
transmit a calibration update request to the non-volatile memory optimization server;
receive, in response to the calibration update request, a calibration update command from the non-volatile memory optimization server, without receiving non-volatile memory operating parameters stored in the non-volatile memory optimization server, the calibration update command comprising a non-volatile memory operating parameter set identifier, wherein the non-volatile memory operating parameter set identifier is based on the internal memory performance data of the non-volatile memory device and internal memory performance data of other non-volatile memory devices; and
update memory operating parameters with a new non-volatile memory operating parameter set associated with the non-volatile memory operating parameter set identifier,
wherein the non-volatile memory device, the other non-volatile memory devices, the host, and the non-volatile memory optimization server are separate and distinct from one another, and wherein the non-volatile memory optimization server is outside the non-volatile memory device.

13. The non-volatile memory device of claim 12, wherein the new non-volatile memory operating parameter set comprises an adjusted read threshold voltage.

14. The non-volatile memory device of claim 12, wherein:
the non-volatile memory further comprises a plurality of pre-stored sets of non-volatile memory device operating parameters; and
to update memory operating parameters, the controller is configured to retrieve, from the non-volatile memory, an operating parameter set identified by the non-volatile memory operating parameter set identifier.

15. The non-volatile memory device of claim 12, wherein the controller is configured to periodically transmit logged internal memory performance data via the host using an error transmission protocol.

16. The non-volatile memory device of claim 12, wherein the logged internal memory performance data for the non-volatile memory device comprises at least one of program/erase cycles, bit error rate, uncorrectable error correction code (UECC) instances, grown bad block number, power consumption, read or write latency, or leakage current, and
wherein the internal memory performance data of the other non-volatile memory devices comprises one or more of program/erase cycles, bit error rate, uncorrectable error correction code (UECC) instances, grown bad block number, power consumption, read or write latency, or leakage current.

17. The non-volatile memory device of claim 12, wherein the controller is configured to receive the calibration update command having the non-volatile memory operating parameter set identifier via a firmware update protocol.

18. The non-volatile memory device of claim 12, wherein the self-calibration trigger event comprises a read or write latency exceeding a predetermined threshold.

19. The non-volatile memory device of claim 12, wherein the new non-volatile memory operating parameter set comprises a new read threshold level for the non-volatile memory device.

20. A method of updating non-volatile memory operating parameters of a first storage device based on internal memory performance characteristics of a plurality of storage devices, the method comprising:
in a crowdsourcing server remotely located from the plurality of storage devices:
receiving periodic internal memory performance reports from the plurality of storage devices;
monitoring for an abnormal data pattern in the periodic internal memory performance reports from the plurality of storage devices;
in response to identifying the abnormal data pattern in one of the plurality of storage devices, identifying a preferred one of a predetermined number of non-volatile memory operating parameter sets associated with the one of the plurality of storage devices based on internal memory performance data from other of the plurality of storage devices of a same type; and
transmitting a non-volatile memory operating parameter set identifier directed to the one of the plurality of storage devices instructing the one of the plurality of storage devices to change its non-volatile memory operating parameters,
wherein the non-volatile memory operating parameter set identifier is transmitted to the one of the plurality of storage devices, without transmitting non-volatile memory operating parameters that are stored in the crowdsourcing server.

21. The method of claim 20,
wherein the non-volatile memory operating parameter set identifier is associated with the preferred one of the predetermined number of non-volatile memory operating parameter sets, and
wherein receiving periodic internal memory performance reports comprises receiving the periodic internal memory performance reports from a host of a respective one of the plurality of storage devices.

* * * * *